Jan. 6, 1970
K. SILVON
3,487,591
CRANK OPERATED SAW CHAIN SHARPENER
Filed Nov. 24, 1967
2 Sheets-Sheet 1
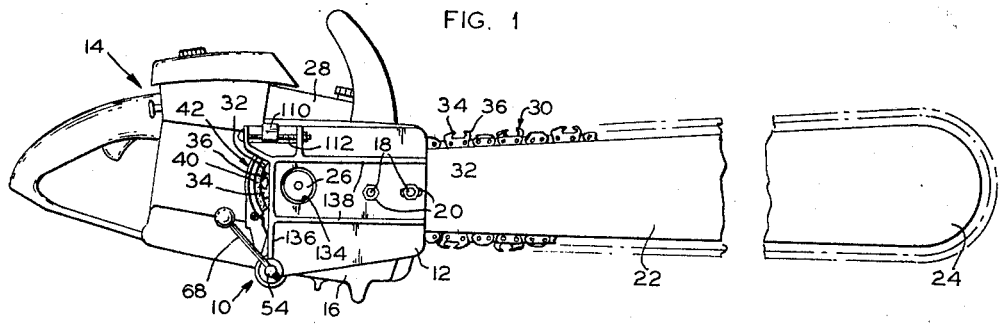
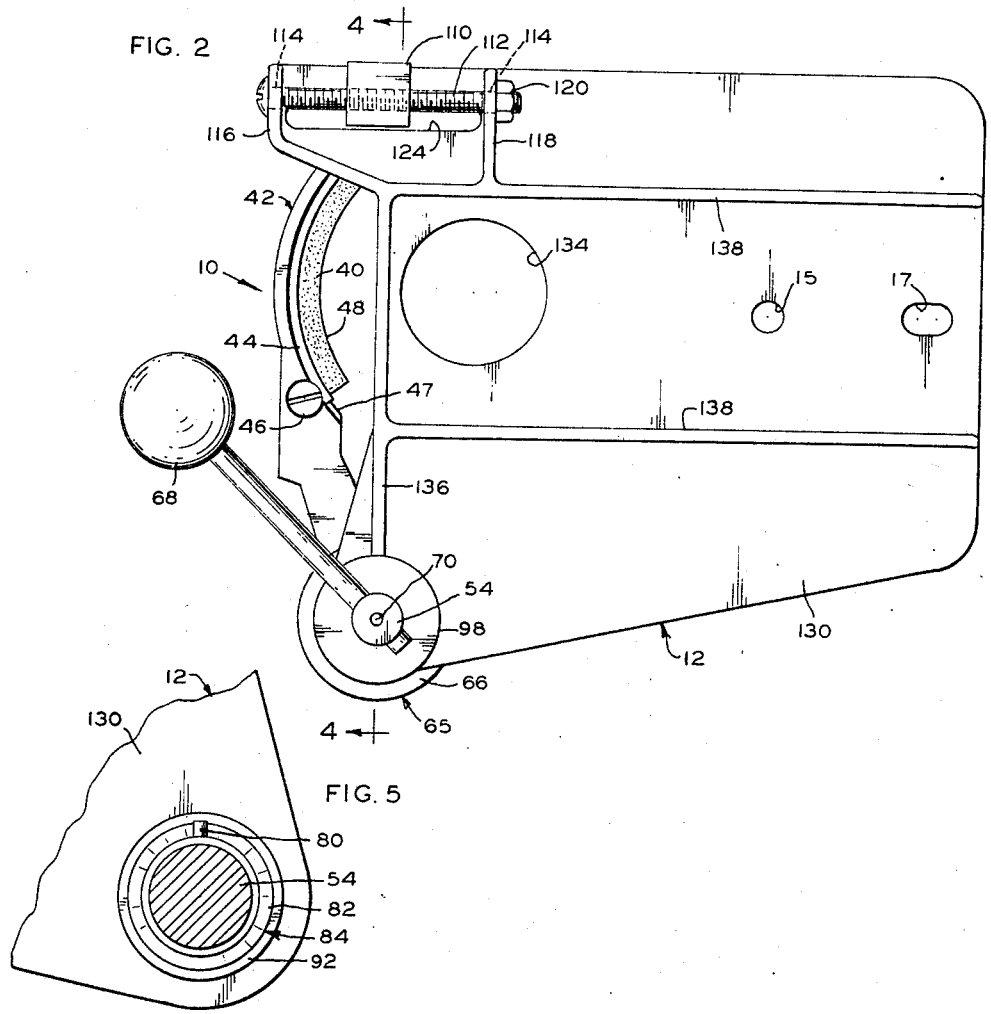
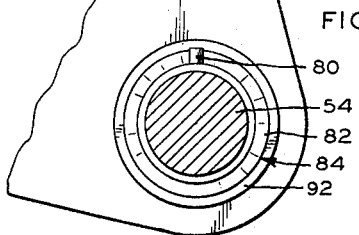
KAY SILVON
INVENTOR
BY
BUCKHORN, BLORE, KLARQUIST & SPARKMAN
ATTORNEYS Jan. 6, 1970  K. SILVON  3,487,591

CRANK OPERATED SAW CHAIN SHARPENER

Filed Nov. 24, 1967  2 Sheets-Sheet 2

KAY SILVON
INVENTOR

BY
BUCKHORN, BLORE, KLARQUIST & SPARKMAN
ATTORNEYS

United States Patent Office 3,487,591
Patented Jan. 6, 1970

---

3,487,591
CRANK OPERATED SAW CHAIN SHARPENER
Kay Silvon, Portland, Oreg., assignor to Omark Industries, Inc., Portland, Oreg., a corporation of Oregon
Filed Nov. 24, 1967, Ser. No. 685,441
Int. Cl. B24b 19/00, 23/00
U.S. Cl. 51—241                     9 Claims

ABSTRACT OF THE DISCLOSURE

A crank 68 of a sharpener 10 is turned to move, through a slipping clutch 65, a sharpening stone 40 into engagement with a saw chain 30 on a sprocket 26. Continued turning movement of the crank revolves a follower pin 80 (FIG. 4 and 5) relative to a cam face 82 to reciprocate the stone 40 back and forth relative to the chain to dress the stone. An adjustable stop nut 110 limits the depth of the sharpening cut. The sharpener 10 is mounted on a plate-like cover 12, which is detachable from the chain saw 14 (FIG. 1).

Description

This invention relates to a crank operated saw chain sharpener, and more particularly to a cover mounted, crank operated saw chain sharpener.

An object of the invention is to provide a crank operated saw chain sharpener.

Another object of the invention is to provide a crank operated, cover mounted saw chain sharpener.

A further object of the invention is to provide a saw chain sharpener which is adapted to be easily mounted on a large number of different types of chain saws.

Another object of the invention is to provide a saw chain sharpener in which turning of a crank urges a sharpening stone into engagement with a saw chain and moves the stone back and forth across the saw chain to dress the sharpening surface of the stone while sharpening the saw chain.

Another object of the invention is to provide a saw chain sharpener in which a sharpening stone is urged with a predetermined force against a saw chain being sharpened.

The invention provides a saw chain sharpener in which a slipping clutch urges a sharpening member against a saw chain being sharpened and the drive of the clutch also reciprocates the sharpening member to dress the sharpening member. Preferably the sharpener is carried by a plate-like cover which can be easily mounted on almost all types of commercially available chain saws. The drive of the clutch may include a manual crank which, in addition to driving the clutch, also actuates cam means to effect reciprocation of the stone.

A complete understanding of the invention may be obtained from the following detailed description of a crank operated saw chain sharpener forming a specific embodiment thereof, when read in conjunction with the appended drawings, in which:

FIG. 1 is a front elevation view of a chain saw having a crank operated saw chain sharpener forming one embodiment of the invention;

FIG. 2 is an enlarged, front elevation view of the saw chain sharpener of FIG. 1 and a sprocket cover forming an attachment unit with the sharpener;

FIG. 5 is an enlarged vertical sectional view taken along line 5—5 of FIG. 4.

Figure 3:
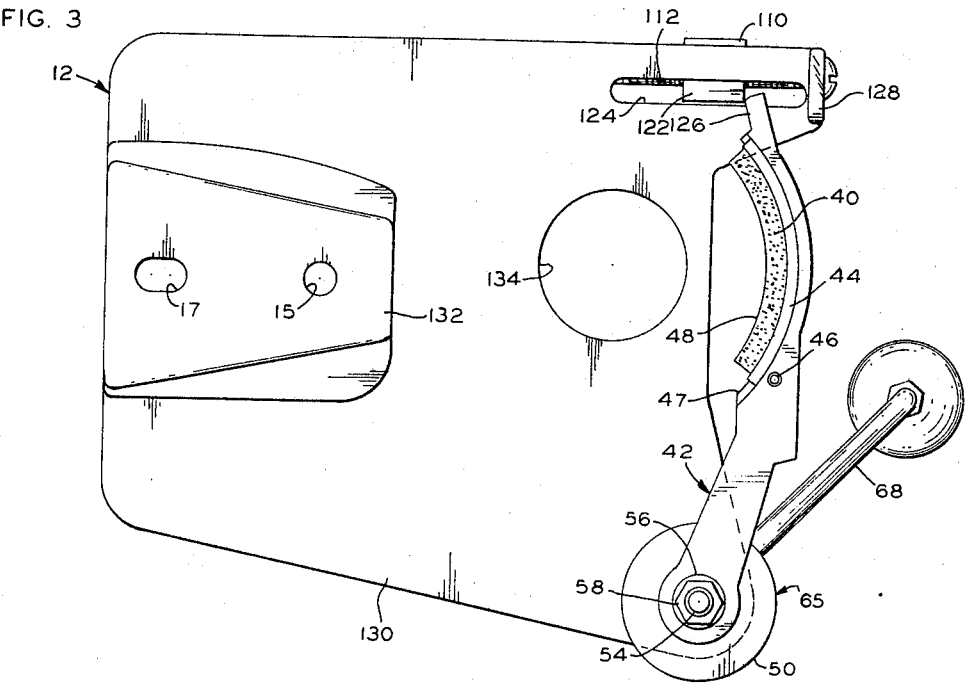
FIG. 3 is an enlarged rear elevation view of the attachment unit of FIG. 2.

Referring now in detail to the drawings, there is shown therein a crank operated saw chain sharpener 10 forming one embodiment of the invention and mounted entirely on a sprocket cover 12 of a chain saw 14 (FIG. 1). The cover has mounting holes 15 and 17, and is detachably mounted on an engine frame 16 of the chain saw by studs 18 and nuts 20, which also secure a saw bar 22 having an arcuate nose end portion 24. The saw bar and a sprocket 26 driven by an engine 28 guide a known saw chain 30 which is top sharpenable and includes cutter links 32 having cutters 34 and depth gauges 36. The sharpener 10 power sharpens the cutter teeth and the depth gauges by grinding the tips thereof as they are advanced by the sprocket. The sharpener 10 is entirely mounted on the cover and forms a unit therewith which can be substituted for covers of used saws.

Figure 4:
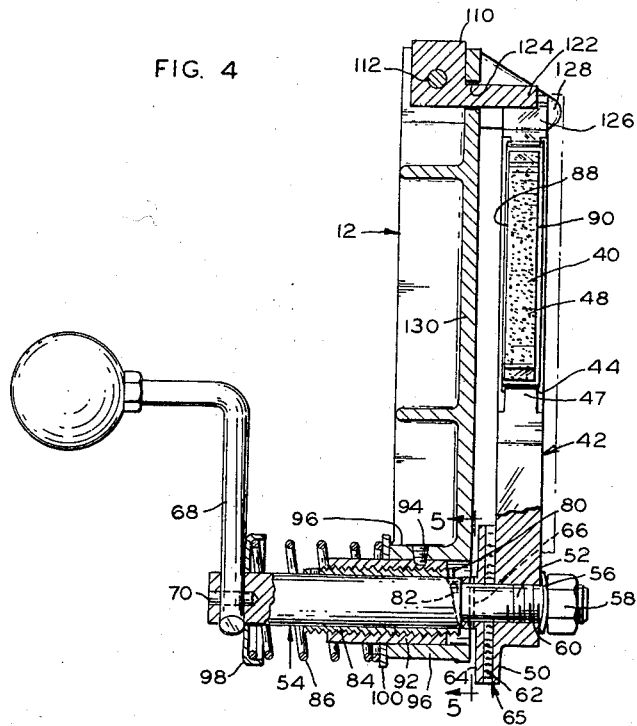
FIG. 4 is an enlarged vertical sectional view taken along line 4—4 of FIG. 2.

The sharpener 10 includes an arcuate sharpening stone 40 (FIGS. 2–4) replaceably mounted on an arm 42 by a carrying shoe 44 and a screw 46. The shoe 44 is arcuate and dovetailed, and an arcuate, dovetailed guide portion 47 of the arm 42 guides the shoe. Preferably, these are stops on the shoe and the arm 42 to limit movement of the shoe relative to the arm in a clockwise direction, as viewed in FIG. 2, beyond the operative position thereof shown in FIG. 2. The screw 46 clamps the shoe to the arm in this position. The stone 40 has an arcuate or cylindrical sharpening surface 48, which is concentric to the sprocket 26 when the stone is brought into contact with the tips of the cutters 34 and depth gauges 36.

The arm 42 has a smooth faced clutch disc portion 50 (FIGS. 3 and 4) integral therewith, is mounted rotatably on a reduced portion 52 of a shaft 54 and is pressed by a spring washer 56 and a nut 58 screwed onto threaded end portion 60 of the portion 52, against a clutch washer 62 of clutch material. The washer 62 is pressed against a smooth surfaced clutch disc 64 having a hub locked to the shaft 54 by a pin 66. The clutch disc portion 50, the clutch washer 62 and the clutch disc 64 form a friction clutch 65. A crank 68 is secured to the outer end of the shaft by a pin 70. When the crank is rotated counterclockwise, as viewed in FIG. 3, it swings the arm 42 and the stone 40 counterclockwise into engagement with the tips of the cutter teeth 34 and depth gauges 36, the clutch 65 slipping after the stone engages the tips so that the stone is merely urged against the tips by the clutch with the desired force.

The width of the sharpening stone 40 (FIG. 4) is substantially greater than the width of the path of the tips of the cutter teeth 34 and depth gauges 36, and to dress the sharpening surface 48 of the stone as the crank arm 68 is rotated, a follower pin 80 fixed to the shaft 54 is moved back and forth by a cam face 82 of a cam bushing 84 and a compression spring 86 to impart a dressing movement to the stone 40 parallel to the axis of the shaft. The distance the stone is oscillated is determined by the throw of the cam face 82 which is made such that side edges 88 and 90 of the stone are moved alternately just into the path of the tips of the cutter teeth 34 and depth gauges 36, which insures dressing of the surface 48 across its entire width. The cam bushing 84 journals the shaft 54 therein and is exteriorly threaded. The cam bushing is adjustably screwed into a tapped mounting sleeve 92 secured by a set screw 94 in a boss portion 96 of the cover 12. The spring 86 is mounted between a washer-like, cupped spring seat 98 rotatably mounted on the shaft 54 and a washer 100 abutting the boss portion 96. The spring 86 urges the shaft 54 toward the left, as viewed in FIG. 4, to keep the follower pin 80 in engagement with the cam surface 82.

The extent of sharpening in each sharpening operation is precisely regulated by a stop nut 110 (FIGS. 2–4), which is selectively positioned by the user by means of an adjustment screw 112 screwed through the nut 110 and journaled in bores 114 in ribs 116 and 118 of the cover 12. A nut 120 fixed to the screw 112 and the head of the screw prevent longitudinal movement of the screw relative to the ribs. The stop nut 110 has a splining flange 122 extending slidably through a splining slot 124 in the cover and into the path of an end portion 126 of the arm 42. When the end portion 126 engages the flange 122, the depth of the sharpening cut is completed. When the crank 68 is turned clockwise, as viewed in FIG. 3, which is done at the end of a sharpening operation, the arm 42 is swung back to its retracted position in which the end portion 126 engages a stop 128 of the cover 12. If desired, a spring (not shown) may be connected between the cover 12 and the arm 42 to normally hold the arm in its retracted position.

The cover 12 is adapted to be mounted on almost all types of commercially available chain saws, the hole 15 fixing the position of the cover and the hole 17 being a slot to adapt the cover to different spacings of the studs 18. The cover comprises a planar plate 130 and has a boss portion 132 (FIG. 3) for engaging the saw bar 22 or shims (not shown) to precisely space the planar plate 130 axially from the sprocket 26. The plate 130 has a hole 134 therein aligned with the sprocket 26. The cover has stiffening ribs 136 and 138 on the outer face of the plate It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a saw chain sharpener,
an arcuate abrading member,
carrier means carrying the abrading member for movement between a retracted position away from an arcuate portion of a path of tips of projecting elements of a saw chain and a sharpening position engaging the tips in the arcuate portion and also movable back and forth across the arcuate portion of the path in a dressing movement,
actuating means for moving the carrier means to move the abrading member to the sharpening position thereof, and
rotary cam means for moving the carrier means back and forth in the dressing movement of the abrading member.

2. The saw chain sharpener of claim 1 wherein the actuating means includes clutch means for pressing the carrier means toward the sharpening position of the abrading member and for turning the rotary cam means.

3. The saw chain sharpener of claim 2 including manually operable crank means for rotating the rotary cam means and for driving the clutch to urge the carrier means to move the abrading member toward the sharpening position thereof.

4. The saw chain sharpener of claim 1 including adjustable stop means for limiting movement of the abrading member toward said arcuate portion of said path.

5. The saw chain sharpener of claim 1 including a cover supporting the carrier means, the actuating means and the rotary cam means and adapted to be secured to a chain saw in a predetermined position covering a sprocket of the chain saw.

6. The saw chain sharpener of claim 5 wherein the cover comprises a plate-like member.

7. The saw chain sharpener of claim 5 wherein the actuating means includes clutch means and including manually operable crank means carried by the cover for rotating the rotary cam means and for driving the clutch means.

8. In a saw chain sharpener,
a cover having a bore therethrough,
a sleeve fixed in the bore,
a bushing mounted in the bore for longitudinal adjustment relative thereto and having a cam face at one end thereof,
a shaft journaled in and slidable in the bushing and having cam follower means adapted to engage the cam face,
a crank handle on one end of the shaft,
a carrier arm pivotal on the other end of the shaft,
slipping clutch means coupling the arm to the shaft,
means urging the shaft relative to the bushing to hold the cam follower means against the cam face, and
arcuate abrasive means carried by the arm.

9. The saw chain sharpener of claim 8 wherein the cover has a slot therein and including a stop member extending through the slot into the path of the arm and slidable along the slot and adjustment means for sliding the stop member along the slot.

References Cited

UNITED STATES PATENTS 3,301,098 1/1967 Oehrli _____ 143—32
3,147,644 9/1964 Oehrli _____ 76—37

JAMES L. JONES, Jr., Primary Examiner

U.S. Cl. X.R.

76—37; 143—32